Cutler & Swallow.
Brick-Machine.
No 75668.   Patented Mar. 17, 1868.
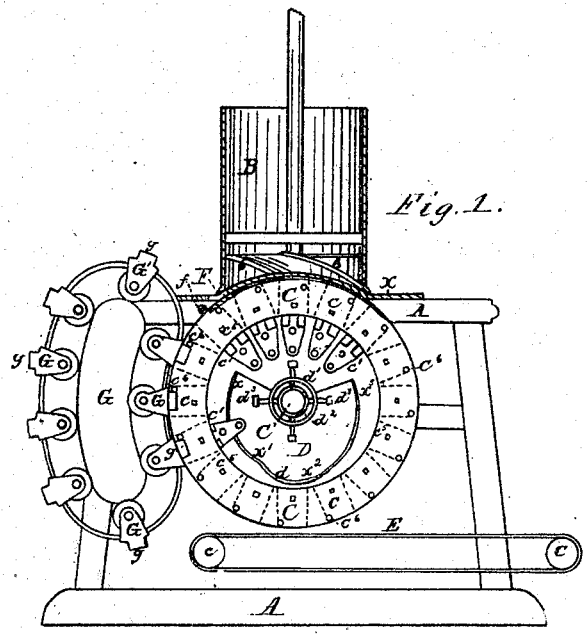
Fig. 1.
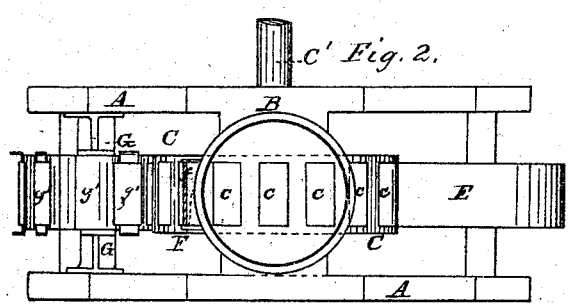
Fig. 2.
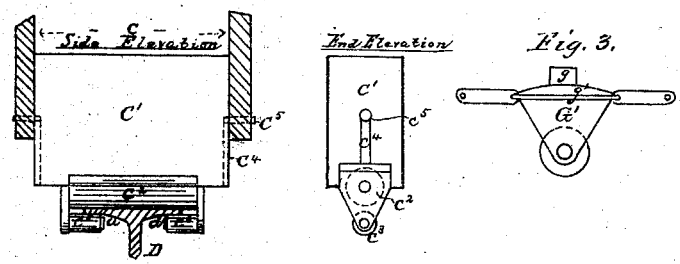
Side Elevation.   End Elevation.   Fig. 3.
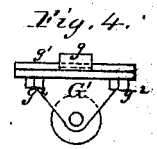
Fig. 4.
Witnesses
Geo. P. Kartkel Jr.
Geo. W. Henry
Inventors
R. Cutler, G. C. Swallow
by M. Randolph & Co. their attys

United States Patent Office.

RENSSELAER CUTLER, OF ST. LOUIS, AND GEORGE C. SWALLOW, OF COLUMBIA, MISSOURI.

Letters Patent No. 75,668, dated March 17, 1868.

IMPROVED BRICK-MACHINE.

*The Schedule referred to in these Letters Patent and making part of the same.*

TO ALL WHOM IT MAY CONCERN:

Be it known that we, RENSSELAER CUTLER, of the city and county of St. Louis, and State of Missouri, and GEORGE C. SWALLOW, of Columbia, in the county of Boone, and State of Missouri, have made certain new and useful improvements in Brick-Machines; and we do hereby declare that the following is a full and clear description thereof, reference being had to the accompanying drawings, and to the letters of reference marked thereon.

This invention relates to an improvement in that class of brick-machines wherein a rotating disk is provided with moulds in its periphery, and is placed under a pug-mill from which it receives the clay prepared for the formation of bricks.

The chief features of the improvement in the machine refer especially to the concave formation of the bottom of the pug-mill; the construction and arrangement of the cam which operates the followers or plungers that compress the clay within the moulds, and force the completed bricks out of the moulds and on to a conveyer or off-bearer; to the scraper for clearing the face of the moulds as they leave the pug-mill; and to the pressure-bed and blocks that cover the faces of the moulds, and receive the pressure of the plungers in forming the bricks.

To enable those skilled in the art to make and use our improved brick-machine, we will proceed to describe its construction and operation.

Figure 1 of the drawings is a sectional elevation of the improved machine.

Figure 2 is a plan of the same, having the pug-mill removed.

Figures 3 and 4 are details of the pressure-blocks that cover the faces of the moulds during the pressing-operation.

The frame A may be of any convenient form to sustain the operative parts of the machinery, and on top of this frame is placed the pug-mill B, the bottom wings $b$ of which are to be formed concave on the bottom; the concavity being concentric with the disk C, which is placed below the said pug-mill, the bottom of which is formed in this concave section for the purpose of bringing these operative parts into the closest juxtaposition. An intermediate convex plate, $x$, is placed between the disk and the pug-mill; it being arranged in such manner as not to interfere with the operative parts. The disk C has its periphery studded at regular intervals with the moulds $c$, (represented by the dotted lines in fig. 1.) These moulds radiate from the centre of the disk, which is sustained on the shaft $C'$, and each of them is fitted with a plunger or follower, $c^1$; the said followers being actuated radially, forward and backward, by the cam D. This cam-plate D occupies about three-quarters (more or less) of the bottom of the circular area of the disk which surrounds it. The periphery of the cam terminates in a T-shaped rib, $d$, which actuates the followers $c^1$ in the required manner, as hereinafter more fully explained. A boss, $d^1$, surrounds the aperture for the shaft $C'$, and a bearing-ring, $d^2$, fits closely to the said shaft within the said aperture, thus leaving an annular opening between the boss and ring, which permits of a lateral or vertical adjustment of the cam, by means of the set-screws $d^3$. The followers or plungers, $c^1$, have rollers, $c^2$, in their inner ends, arranged to press against the exterior of the rib $d$, in forcing the plungers out, and rollers, $c^3$, arranged to press against the bottom of the rib $d$, to draw the plunger in after the delivery of a brick.

The arrangement of the rollers $c^2$ and $c^3$ is clearly shown in detail drawings. As the rollers $c^3$ have only to withdraw the plungers, the work devolving upon them is but slight, hence they need only be supported at one end, as shown in fig. 4. In the ends of the followers are grooves, $c^4$, that receive the pins $c^5$, shown in the transverse sectional detail of the disk C. When the plungers are fully drawn in, for the reception of new clay into the moulds, they will rest on these pins, $c^5$, between the ends of the rib $d$ in the upper part of the circuit of the disk. The contour of the rib $d$ is such that the upper forward end, $x$, will receive the rollers $c^2$ $c^3$, as the plungers rest on the pins $c^5$, and then gradually push the said plungers outward, as they are carried forward by the revolving disk, until the point $x^1$ is reached, when the brick within the moulds on that side will have been fully pressed to the proper size; then, between the points $x^1$ and $x^2$, the rib $d$ will be suddenly curved outward far enough to throw the plunger clear through the mould, and the finished brick out upon the conveyer, or off-bearer E, which will take the finished bricks away to the yard. Between the points $x^2$ and $x^3$, the rib $d$ will gradually curve inward again, so as to withdraw the plungers, which withdrawal will have been fully accomplished by the time the point $x^3$ shall have been reached, when the plungers will again rest on the pins $c^5$, preparatory to again filling the moulds.

The conveyer or off-bearer E is an endless belt, passing around the two pulleys $e$ and $e^1$, one of which may be made a driving-pulley to operate the device. This conveyer will be placed at the bottom of the disk in such a position as to readily receive the bricks from the machine. A scraping-knife, F, is placed on the upper forward side of the disk, in such a position as to scrape off the face of the disk and moulds clean immediately after leaving the pug-mill. The scraper is held up to its work by the wooden pin $f$, placed behind it for that purpose, the said pin being arranged to break and let the knife drop out, should it engage a stone or other hard or deleterious substance that might have passed through the mill. Set-screws (not shown) might be used to hold the forward end of the knife down upon the disk.

A pressure-bed, G, is placed at the front side of the machine to receive the pressure of the followers $c^1$ in forming the bricks. Around this pressure-bed is arranged a series of pressure-blocks, $G^1$, connected together by an endless chain, and arranged to revolve with the disk C in such a manner that each of the moulds will be covered by a pressure-block, while the clay within it is under pressure from the follower $c^1$. Tips, $g$, projecting from the ends of the blocks $G^1$, overlap the sides of the disk, and are engaged by the pins, $c^5$, that project from the sides of the disk in such a manner as to take hold on the said lips and move the pressure-blocks forward in such a manner as to cause one of them to fall against each of the moulds in the said disk. The face-plates, $g^1$, may have their pressing-faces constructed either straight or convex, as may be best suited to the construction of the bricks needed for different purposes. These plates may be adjustable by means of the set-screws $g^2$, shown in the detail drawing.

The pins $c^5$, on which the followers are made to rest while the moulds are being filled, are to have square ends, both inside of the mould recess and outside of the disk, the outer squares being used for the purpose of turning the said pins, so that the inner squares shall be turned flatwise or cornerwise to the follower-seat, thereby adjusting that seat to a distance more or less remote from the periphery of the disk, in order to make the mould more or less deep, as may be required for the manipulation of different qualities of clay.

Having described our invention, what we claim, is—

The pug-mill B, when its bottom wings $b$ are formed concavely on the bottom, and combined with a disk, C, and intermediate convex plate, as described and shown.

R. CUTLER,
G. C. SWALLOW.

Witnesses:
M. RANDOLPH,
S. M. RANDOLPH.